(12) United States Patent
Kim

(10) Patent No.: US 8,237,952 B2
(45) Date of Patent: Aug. 7, 2012

(54) METHOD OF SETTING DEFAULT PRINTER IN A HOST DEVICE

(75) Inventor: Young-ju Kim, Suwon-si (KR)

(73) Assignee: Samsung Electronics Co, Ltd., Suwon-si (KR)

( * ) Notice: Subject to any disclaimer, the term of this patent is extended or adjusted under 35 U.S.C. 154(b) by 1833 days.

(21) Appl. No.: 11/155,600

(22) Filed: Jun. 20, 2005

(65) Prior Publication Data

US 2005/0280858 A1 Dec. 22, 2005

(30) Foreign Application Priority Data

Jun. 18, 2004 (KR) .......................... 10-2004-0045407
May 14, 2005 (KR) .......................... 10-2005-0040383

(51) Int. Cl.
*G06F 3/12* (2006.01)
*G06F 15/00* (2006.01)
*H04N 1/00* (2006.01)

(52) U.S. Cl. ........... 358/1.15; 358/1.9; 358/305; 710/15

(58) Field of Classification Search ................ 358/1.15, 358/1.16, 1.9, 305; 710/15; 715/700
See application file for complete search history.

(56) References Cited

U.S. PATENT DOCUMENTS

| 7,047,528 B2* | 5/2006 | Iida ............................... 717/170 |
| 2003/0126316 A1* | 7/2003 | Parker ............................. 710/15 |
| 2005/0108642 A1* | 5/2005 | Sinclair, II ...................... 715/700 |

FOREIGN PATENT DOCUMENTS

| GB | 2356723 A | * 5/2001 |
| JP | 05-241747 | 9/1993 |
| JP | 11-224174 | 8/1999 |
| JP | 2000-353081 | 12/2000 |
| JP | 2002-268847 | 9/2002 |
| JP | 2003-84942 | 3/2003 |
| JP | 2003-280840 | 10/2003 |
| KR | 2000-9162 | 2/2000 |

OTHER PUBLICATIONS

Korean Office Action dated Jul. 12, 2006 issued in KR 2005-40383.

* cited by examiner

*Primary Examiner* — Thomas Lett
(74) *Attorney, Agent, or Firm* — Stanzione & Kim, LLP

(57) ABSTRACT

A method and apparatus to set printer driver information. The method includes detecting identification information to identify printer setup information selected in an application program, detecting a printer driver information corresponding to the detected identification information, and setting and storing the selected printer setup information as printer setup information of the detected printer driver information. When the user selects the printer setup information in a specific application program, the printer setup information setup in a printer folder is set as the printer setup information selected by the user. Specifically, when the user selects the default printer in the specific application program, the default printer of the printer driver information is set as the default printer selected by the user, so that the setup information selected in the application program is maintained as the printer driver information even after the application program is terminated.

16 Claims, 6 Drawing Sheets

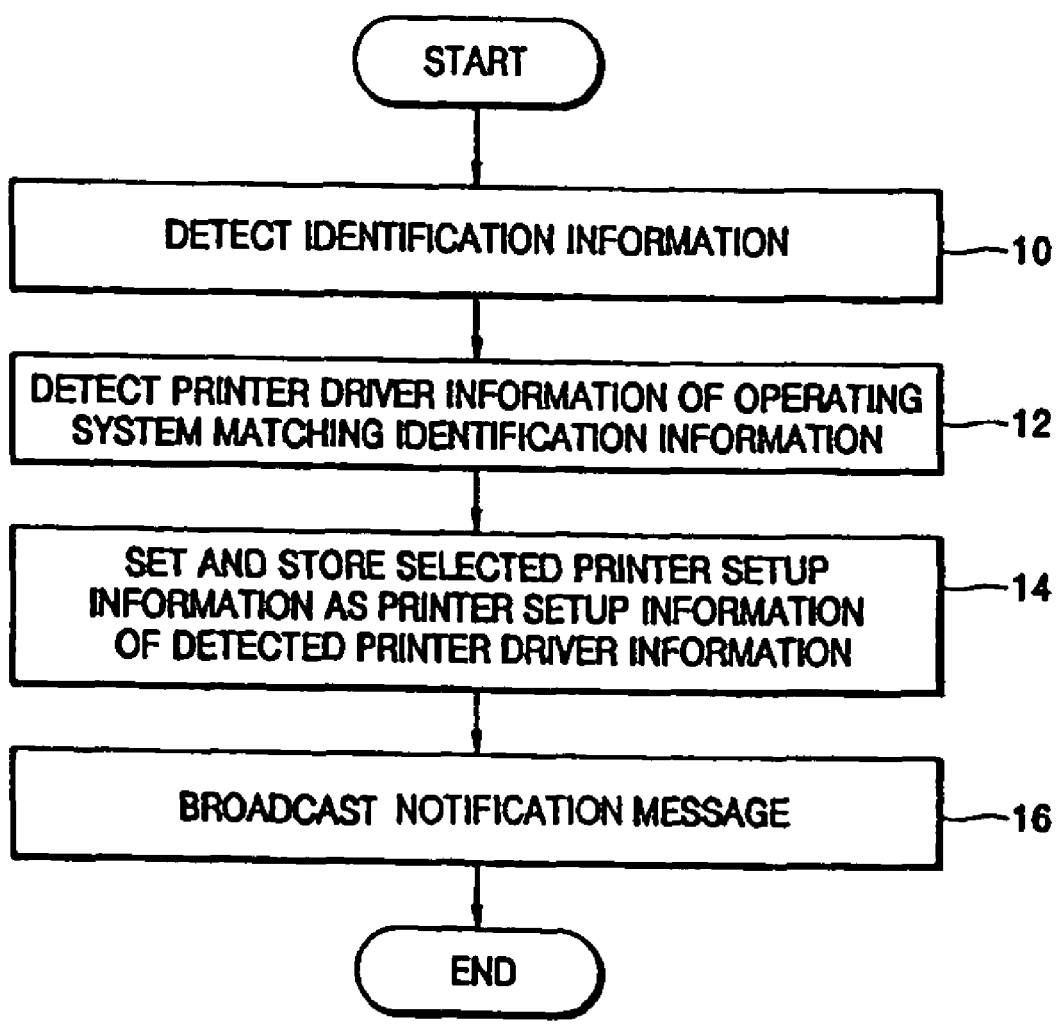

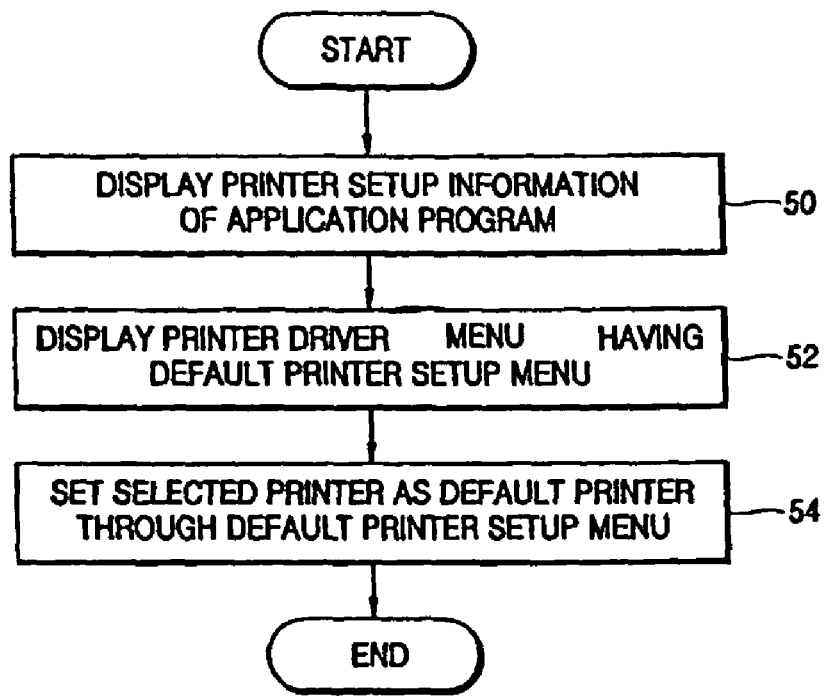
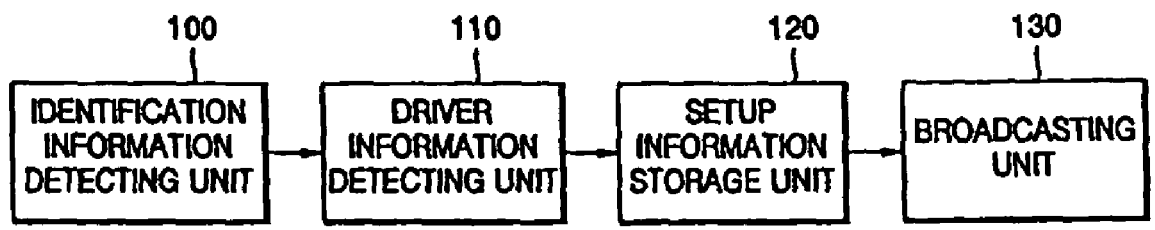

METHOD OF SETTING DEFAULT PRINTER IN A HOST DEVICE

CROSS-REFERENCE TO RELATED APPLICATIONS

This application claims the priority under 35 U.S.C. §119 of Korean Patent Application No. 2004-45407, filed on Jun. 18, 2004, and Korean Patent Application No. 2005-40383, filed on May 14, 2005, in the Korean Intellectual Property Office, the disclosures of which are incorporated herein in their entirety by reference.

BACKGROUND OF THE INVENTION

1. Field of the Invention

The present general inventive concept relates to setting printer information, and more particularly, to a method and apparatus to set printer driver information in an application program.

2. Description of the Related Art

In conventional approaches for setting or changing a default printer, a user must select one of various printers installed in a printer folder as a default printer so that the selected printer can function as the default printer.

Although it is possible to select a desired printer to execute printing in a specific application program (e.g., MS-word or Photoshop), the default printer set in the printer folder is not changed in the application program. Even though the user selects the desired printer in the specific application program, the previously set default printer remains the default printer when the application program is terminated. Therefore, when using another application program, the user must perform the above operation again to select the desired printer.

In addition, values of printer information set in the application program are restored to default values of the printer information of a printer driver previously set in the printer folder when the application program is terminated. Accordingly, it is inconvenient for the user to have to change the default values of the printer information in the printer folder in order to change the default values of the printer information.

In order to change the default printer and the default values of the printer information when two or more printers are used in the same host, the user opens the printer folder of an operating system (e.g., Windows), uses a mouse to select a printer desired to be set as the default printer, and then presses a right button of the mouse. The user then presses an item "Set as Default Printer" in the displayed menu to set the desired printer as the default printer. Thereafter, the user selects an item "Print Default Setup" in a menu displayed when the user again presses the right button of the mouse, and changes the default values of the printer information.

In more detail, the user opens the printer folder and selects the desired printer. Then, the user presses the right button of the mouse and selects the item "Set as Default Printer" in the displayed menu. In order to change the default values of the printer information, the user again presses the right button of the mouse and selects the item "Print Default Setup". After changing the default values of the printer information of the default printer, the user presses a confirmation button. Accordingly, when the user wants to change the default printer and the default values of the printer information, the default printer setup and the default values of the printer information must be individually set in the printer folder, which requires a large number of operations.

SUMMARY OF THE INVENTION

The present general inventive concept provides a method of setting printer driver information which can automatically set printer driver information using an application program.

The present general inventive concept also provides a method of setting printer driver information which can reduce a number of operations required to set a default printer.

The present general inventive concept also provides an apparatus to automatically set printer driver information through an application program.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a method of setting printer driver information, the method including detecting identification information to identify a printer corresponding to printer setup information selected in an application program, detecting a printer driver of the printer corresponding to the detected identification information, and setting and storing the selected printer setup information as default settings of the detected printer driver information.

The foregoing and/or other aspects of the present general inventive concept may also be achieved by providing a method of setting printer driver information, the method including displaying a printer driver having a default printer setup menu to set a selected printer as a default printer, and setting the selected printer as the default printer through the displayed default printer setup menu.

The foregoing and/or other aspects of the present general inventive concept may also be achieved by providing an apparatus to set printer driver information, the apparatus including an identification information detecting unit to detect identification information to identify a printer corresponding to printer setup information selected in an application program, a driver information detecting unit to detect a printer driver corresponding to the detected identification information, and a setup information storage unit to set and store the selected printer setup information as default settings of the detected printer driver.

The foregoing and/or other aspects of the present general inventive concept may also be achieved by providing an apparatus to set printer driver information, the apparatus including a user interface to display a printer driver having a default printer setup menu to set a selected printer as a default printer, wherein the user interface sets the selected printer as the default printer through the displayed default printer setup menu.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a flowchart illustrating a method of setting printer driver information according to an embodiment of the prevent general inventive concept;

FIG. 5 is a flowchart illustrating a method of setting printer driver information according to yet another embodiment of the present general inventive concept;

FIG. 6 is a block diagram illustrating an apparatus to set printer driver information according an embodiment of the present general inventive concept.

DETAILED DESCRIPTION OF THE PREFERRED EMBODIMENTS

Figure 2A:
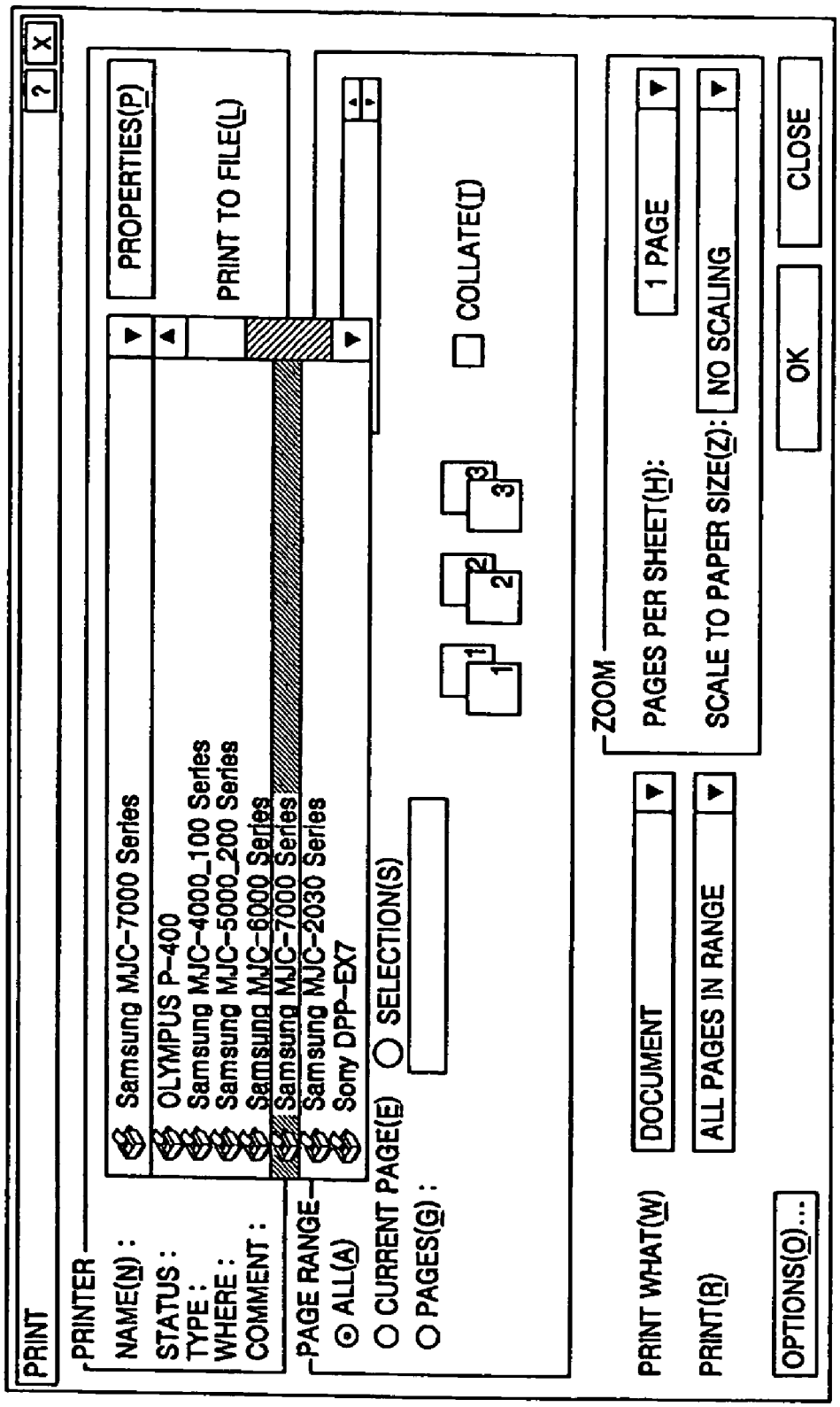
FIG. 2A is a view illustrating selecting a printer in an application program.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a flowchart illustrating a method of setting printer driver information according to an embodiment of the present general inventive concept. The method may include setting and storing printer setup information selected by a user as default values of a printer driver.

Referring to FIG. 1, first, at operation 10, identification information to identify printer setup information selected by a user in an application program is detected. The identification information can be a unique identification number designated to the printer setup information, and acts as a type of pointer information which allows access to a printer driver of the printer setup information. For example, handle information is an example of the identification information.

The printer setup information can include various settings of the printer driver that are selectable by the user in the application program, for example, a number of sheets to be printed, a printing direction, a printing resolution, a printing layout, etc.

The printer driver can have various menus selectable by the user, and can include various default settings, such as a default status of the printer, the number of sheets to be printed, the printing direction, and the printing resolution. The default settings of the printer driver are settings that can be used by all application programs on a host.

FIG. 2A illustrates a default printer being selected by a user in an application program. When a print menu is selected in the application program, a dialog window is displayed, as illustrated in FIG. 2A. When the user selects "Samsung MJC-7000 Series", an identification number corresponding to the default printer information of "Samsung MJC-7000 Series" selected by the user is read.

An identification information detecting function is stored in a host running the application program and called to detect the identification information. The identification information detecting function detects the identification information from a menu name of the printer setup information. For example, an open printer function is a possible type of the identification information detecting function. Accordingly, calling the open printer function allows the user to acquire the identification information (i.e., the unique identification number) of the printer ("Samsung MJC-7000 Series") corresponding to the printer setup information selected by the user.

At operation 12, the printer driver corresponding to the detected identification information is detected. Since the identification information can include the unique identification number of the printer corresponding to the printer setup information selected by the user, it is possible to detect the printer driver of the printer corresponding to the printer setup information selected by the user.

A printer driver information detecting function can be stored in the host and called to detect the printer driver information. The printer driver information detecting function detects the printer driver information from an operating system of the host. For example, a get printer function is a possible type of the printer driver information detecting function.

At operation 14, the selected printer setup information is set and stored as the printer setup information of the read printer driver information. The printer driver information can include all information related to the printer, such as the printer setup information selected by the user. The printer setup information selected by the user is set and stored as the printer setup information of the printer driver information.

Figure 2B:
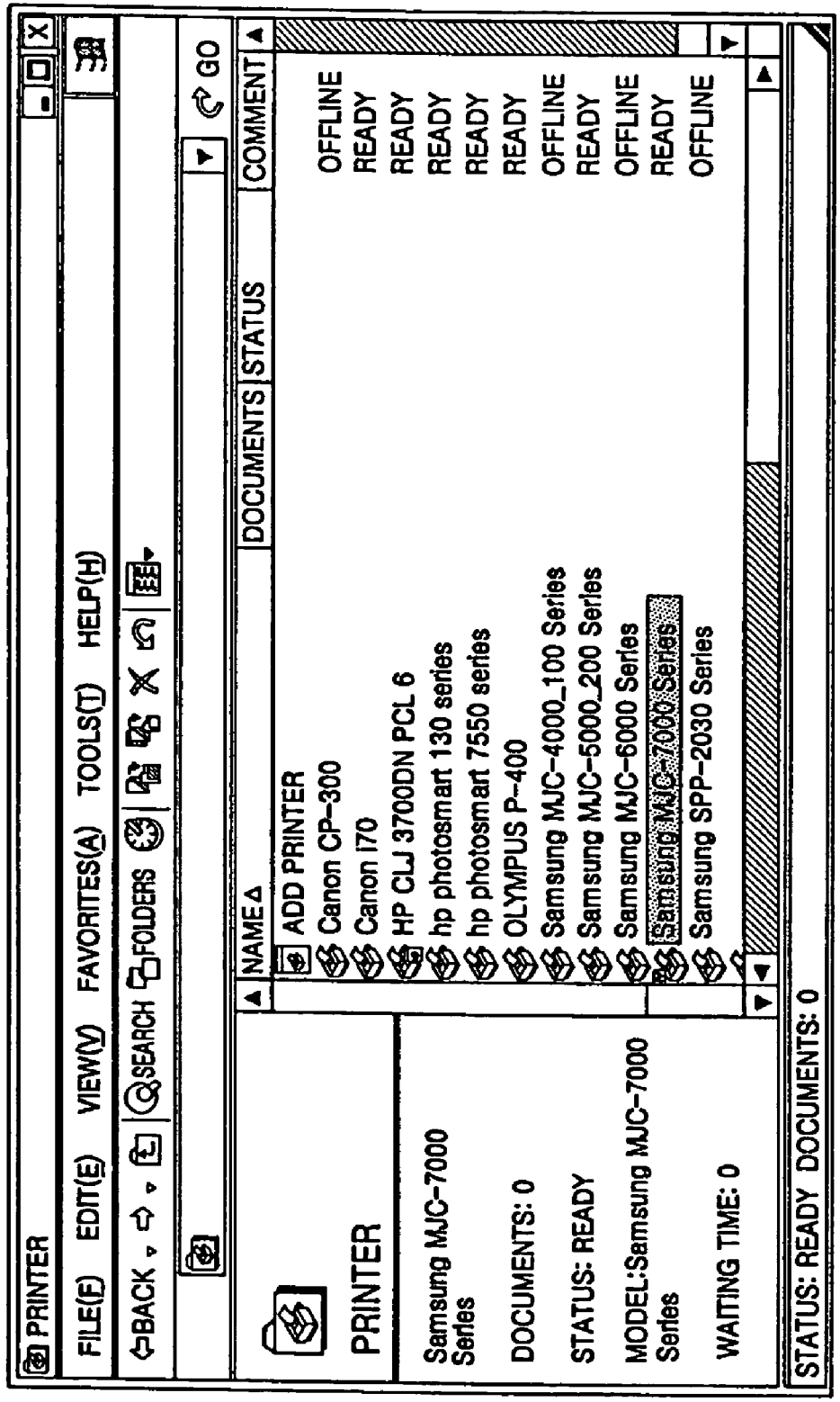
FIG. 2B is a view illustrating a default printer previously set in a printer folder being replaced with the selected printer of FIG. 2A.

FIG. 2B illustrates a default printer previously set in a printer folder being replaced with the printer ("Samsung MJC-7000 Series") selected by the user in FIG. 2A. When the user selects the printer ("Samsung MJC-7000 Series") as illustrated in FIG. 2A, the default settings of the printer driver of the selected printer ("Samsung MJC-7000 Series") are set such that the selected printer ("Samsung MJC-7000 Series") is the default printer, as illustrated in FIG. 2B.

A printer driver information-storing function is used to store the printer driver function that the printer setup information selected by the user is set in. The printer driver information-storing function stores the set printer driver information into a predetermined memory. For example, a set printer information function is a possible type of the printer driver information-storing function.

At operation 16, a notification message is broadcast to activated application programs other than the foregoing application program to notify the activated application programs of the newly set default settings of the printer driver. The notification message informs the application programs that the selected printer setup information is set as default settings of the printer driver. The notification message can be broadcast to all of the activated application programs other than the application program in which the printer setup information is set. Through the broadcasting of the notification message, other application programs can recognize that the printer setup information selected by the user is set as the default settings of the printer driver information.

As described above, when the user selects the printer from the printer setup information in the application program, the default printer in the printer folder can be set as the printer selected by the user so that the user can set the default printer in the application program and therefore need not access the printer folder to change the default printer before running different application programs. The printer selected by the user can be automatically set as the default printer, or alternatively can be set as the default printer as a result of the user setting a default status of the printer setting of the printer setup information which is then stored in the default settings of the printer driver.

In addition, when the user selects printer setup information in the application program, the default settings of the printer driver in the printer folder is set as the printer setup information selected by the user so that the user need not access the printer folder to change the default settings of the printer driver whenever running different application programs. Also, the printer setup information selected in the application program is maintained as the default settings of the printer driver information even after the application program is terminated.

Figure 3:
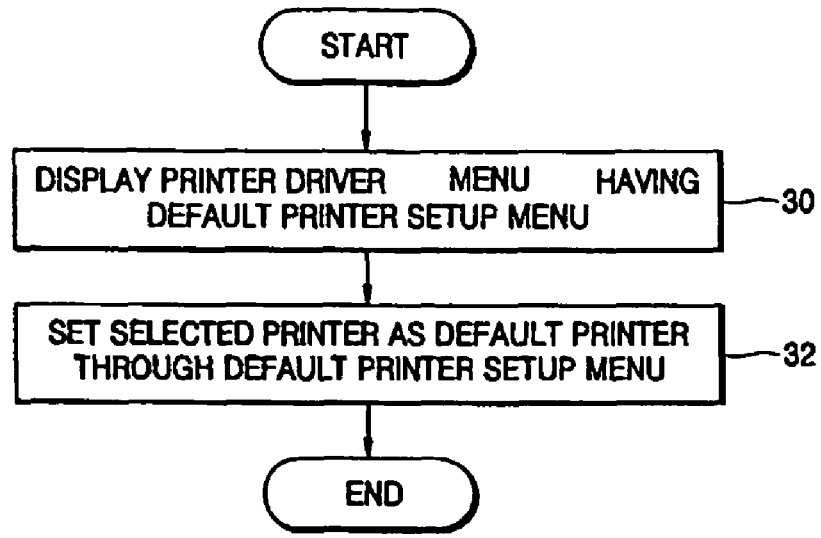
FIG. 3 is a flowchart illustrating a method of setting printer driver information according to another embodiment of the present general inventive concept.

FIG. 3 is a flowchart illustrating a method of setting printer driver information according to another embodiment of the present general inventive concept.

Referring to FIG. 3, at operation 30, a printer driver menu having a default printer setup menu to set a selected printer as a default printer is displayed.

Figure 4:
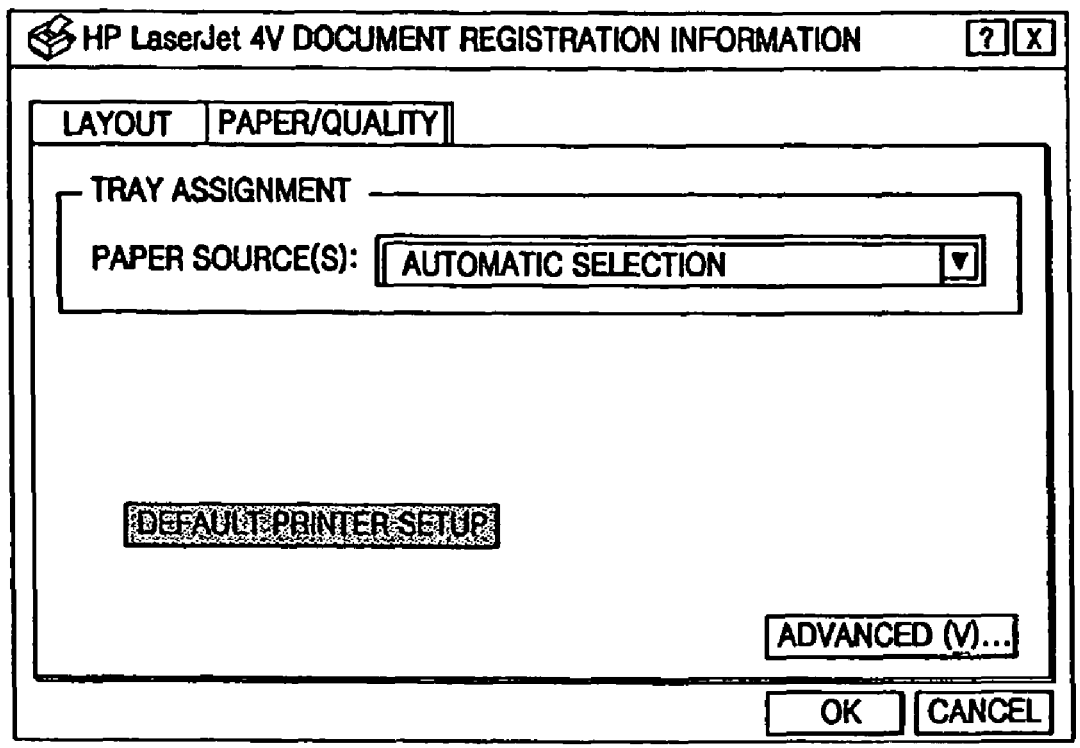
FIG. 4 is a view illustrating an example of a printer driver menu being displayed according to the method of FIG. 3.

FIG. 4 is a view illustrating an example of the printer driver menu displayed according to the method of FIG. 3. As illustrated in FIG. 4, the printer driver menu includes the default printer setup menu. The default printer setup menu receives a command from a user to set the selected printer as the default printer. The default printer setup menu can be configured as a button type menu as illustrated in FIG. 4.

At operation 32, the selected printer is set as the default printer by selecting the default printer setup menu.

More specifically, a printer folder is opened and the printer to be set as the default printer is selected. The printer driver menu including the default printer setup menu is then displayed (operation 30). The default printer setup menu is then selected and the selected printer is set as the default printer (operation 32). Accordingly, the setting of the selected printer as the default printer can be achieved using fewer operations than required by conventional methods. The default printer setup menu can include printer setup information to allow the user to set default settings of the selected printer.

FIG. 5 is a flowchart illustrating a method of setting printer driver information according to yet another embodiment of the present general inventive concept.

Referring to FIG. 5, at operation 50, printer setup information of an application program is displayed.

A user can change the printer setup information through the application program, such as MS word or Photo Shop. The printer setup information can include printer options that are set to print data of the application program.

At operation 52, a printer driver menu having a default printer setup menu to set a selected printer as a default printer is displayed. The user can select registration information corresponding to a printer in the displayed printer setup information. When the user selects the printer using the registration information, the printer driver menu corresponding to the selected printer is displayed. The printer driver menu can include a bar-type default printer setup menu.

At operation 54, the selected printer is set as the default printer by the default printer setup menu. When the user clicks the default printer setup menu, the selected printer is set as the default printer. That is, the default printer can be set through the default printer setup menu in the application program without setting the default printer in a printer folder corresponding to the registration information.

The above described embodiments of the present general inventive concept can be written as computer-readable codes/programs and can be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs, or DVDs), and storage media. The computer-readable recording medium can also be distributed over network coupled computer systems so that the computer-readable code is stored and executed in a distribution fashion.

Also, functional programs, codes, and code segments to implement the embodiments of the present general inventive concept can be easily construed by programmers skilled in the art.

FIG. 6 is a block diagram illustrating an apparatus to set printer driver information according to an embodiment of the present general inventive concept. The apparatus includes an identification information detecting unit 100, a driver information detecting unit 110, a setup information storage unit 120, and a broadcasting unit 130.

The identification information detecting unit 100 detects identification information to identify printer setup information selected by a user, and outputs the detected identification information to the driver information detecting unit 110. The identification information can be a unique identification number designated to the printer setup information, and acts as a type of pointer information which allows access to all of the printer setup information.

The identification information detecting unit 100 can call an identification information detecting function to detect the identification information corresponding to the printer setup information selected by the user.

The driver information detecting unit 110 detects the printer driver corresponding to the detected identification information in an operating system, and outputs the detected printer driver to the setup information storage unit 120.

The driver information detecting unit 110 can call a printer driver information detecting function stored therein to detect the printer driver corresponding to the detected identification information in the operating system.

The setup information storage unit 120 sets and stores the selected printer setup information as default settings of the detected printer driver, and outputs a result to the broadcasting unit 130.

For example, when the user selects a printer, such as the "Samsung MJC-7000 Series" printer as illustrated in FIG. 2A, the printer setup information storage unit 120 sets and stores the printer setup information the printer ("Samsung MJC-7000 Series") as the default settings of the printer driver of the printer ("Samsung MJC-7000 Series"). For example, the user can select a default printer setting of the printer setup information and the printer setup information storage unit 120 sets and stores the selected default printer setting in the default settings of the printer driver to set the selected printer ("Samsung MJC-7000 Series") as a default printer. Alternatively, the printer setup information storage unit 120 can automatically set and store the selected printer ("Samsung MJC-7000 Series") as the default printer.

In order to store the default settings of the printer driver which are set to the printer setup information selected by the user in the application program, the setup information storage unit 120 can call a printer driver information-storing function stored therein, which stores the set default settings of the printer driver.

The broadcasting unit 130 broadcasts a notification message to activated application programs other than the foregoing application program to notify the activated application programs of the newly set default settings of the printer driver. The notification message informs the application programs that the printer setup information selected by the user is set as the default settings of the printer driver. The notification message can also inform the application programs that the selected printer is the default printer.

Figure 7:
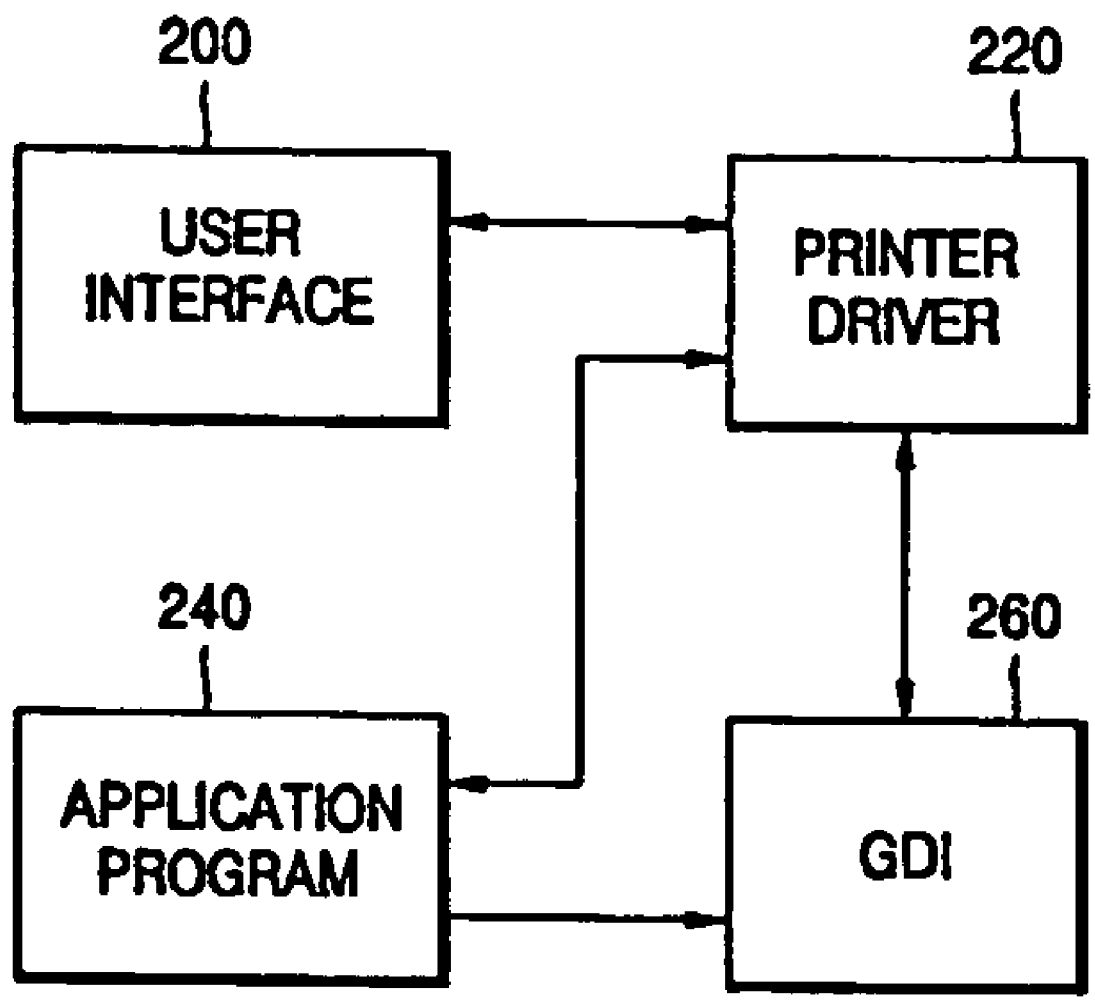
FIG. 7 is a block diagram illustrating an apparatus to set printer driver information according to another embodiment of the present general inventive concept.

FIG. 7 is a block diagram illustrating an apparatus to set printer driver information according to another embodiment of the present general inventive concept. Referring to FIG. 7, the apparatus includes a user interface 200, a printer driver 220, an application program 240, and a graphic device interface (GDI) 260.

The user interface 200 displays a printer driver menu having a default printer setup menu to set a selected printer as a default printer. The user interface 200 sets the selected printer as the default printer using the default printer setup menu.

The default printer setup menu may be configured a button type menu, a bar type menu, and the like.

When a user opens a printer folder and selects the printer to be set as the default printer, the user interface 200 accesses the printer driver 220 of the printer selected by the user and displays the printer driver menu of the printer driver 220. At this point, the user interface 200 displays the default printer setup menu in the printer driver menu.

When user selects the default printer setup menu (for example, the user clicks the default printer setup menu using a mouse), the user interface 200 sets the selected printer as the default printer of the printer driver information.

Meanwhile, printer setup information can be displayed through the application program 240. The user can set the printer setup information of the printer using printer registration information selected in the application program through the printer driver menu. When the verification of the registration information is requested, the application program 240 accesses the printer driver 220 of the selected printer and displays the printer driver menu of the printer driver 220. At this point, the printer driver menu is displayed together with the default printer setup menu. When the user selects the default printer setup menu, the printer selected in the application program 240 is set as the default printer. That is, the present embodiment provides convenience in that the default printer can be set through the default printer setup menu in the application program 240 without setting the default printer in the printer folder. The default printer setup menu can include printer setup information to allow the user to set default settings of the selected printer in the application program.

The GDI 260 communicates with the printer driver 220 and converts data received from the application program 240 into a printer recognizable file. The printer recognizable file can be spooled through a spooler (not shown) and is transmitted to the printer.

According to the embodiments of the present general inventive concept as described above, when a user selects printer setup information in an application program, printer setup information in a printer folder is set as the printer setup information selected by the user. As a consequence, the user can set the printer setup information in a specific application program without repeatedly setting the printer setup information in the printer folder whenever running different application programs.

According to the embodiments of the present general inventive concept, a default printer selected in a specific application program is maintained as the default printer even after termination of the application program.

Also, according to the embodiments of the present general inventive concept, a number of operations required to set the default printer can be reduced by adding a default printer setup menu to a user interface of a printer driver.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of setting a selected printer as a default printer in a host device which is connectable to an image forming apparatus, the method comprising:
    selecting a printer in a printing window of an application program which displays a plurality of printers;
    detecting identification information to identify printer setup information of the selected printer;
    detecting a printer driver information corresponding to the detected identification information;
    setting the selected printer as the default printer by changing the printer setup information of the selected printer to the printer setup information of the detected printer driver information in the printing window of the application program to maintain a default setting of the printer driver information in the application program and another application program even after the application program is terminated, wherein the printer setup information of the detected printer driver information includes a default status setting; and
    displaying the set default printer,
    wherein the method is implemented in the application program.

2. The method of claim 1, wherein the detecting of the identification information comprises:
    calling an identification information detecting function in a host device.

3. The method of claim 2, wherein the detecting of the printer driver information corresponding to the detected identification information comprises:
    calling a printer driver information detecting function in the host device.

4. The method of claim 3, wherein the setting of the selected printer as the default printer comprises:
    calling a printer driver information storing function in the host device.

5. The method of claim 1, further comprising:
    broadcasting a notification message to activated application programs other than the application program after the selected printer setup information is stored as the printer setup information of the detected printer driver information.

6. The method of claim 1, wherein the setting of the selected printer setup information as the printer setup information of the detected printer driver information comprises:
    setting the default status setting to set the printer corresponding to the selected printer setup information as a default printer.

7. A method of setting a selected printer as a default printer in a host device which is connectable to an image forming apparatus, the method comprising:
    selecting a printer in a printing window of an application program which displays a plurality of printers;
    displaying a printer driver menu having a default printer setup menu to set the selected printer as a default printer;
    setting the selected printer as the default printer through the displayed default printer setup menu to maintain a default status setting of the printer driver information in the application program and another application program even after the application program is terminated; and
    setting default settings of the selected printer through the displayed default printer setup menu.

8. A method of setting a selected printer as a default printer in a host device which is connectable to an image forming apparatus, the method comprising:

displaying printer setup information in an application program;

selecting a printer through the displayed printer setup information;

displaying a printer driver menu having a default printer setup menu to set the selected printer as a default printer; and setting the selected printer as the default printer through the displayed default printer setup menu to maintain a default status setting of the printer driver information in the application program and another application program even after the application program is terminated.

9. An apparatus including a processor to set a selected printer as a default printer, the apparatus comprising:
   an identification information detecting unit of the processor to detect identification information to identify printer setup information of the selected printer;
   a driver information detecting unit of the processor to detect a printer driver information corresponding to the detected identification information; and
   a setup information storage unit of the processor to set the selected printer setup information as the default printer by changing the printer setup information of the selected printer to the printer setup information of the detected printer driver information to maintain a default setting of the printer driver information in an application program and another application program even after the application program is terminated,
   wherein the printer setup information of the detected printer driver information includes a default status setting.

10. The apparatus of claim 9, wherein the identification information detecting unit calls an identification information detecting function stored therein to detect the identification information.

11. The apparatus of claim 10, wherein the driver information detecting unit calls a printer driver information detecting function stored therein to detect the printer driver information corresponding to the detected identification information.

12. The apparatus of claim 11, wherein the setup information storage unit calls a printer driver information storing function stored therein to store the selected printer setup information as the printer setup information of the detected printer driver information.

13. The apparatus of claim 9, further comprising:
   a broadcasting unit of the processor to broadcast a notification message to activated application programs other than a first activated application program to notify the activated application programs of the default settings of the detected printer driver information set by the setup information storage unit.

14. The apparatus of claim 9, wherein the selected printer setup information comprises a default printer setting selectable to set the printer corresponding to the selected printer setup information as a default printer of the host, setup information storage unit stores the default printer setting to set the printer corresponding to the selected printer setup information as the default printer of the host when the default printer setting is selected in the application program.

15. A method of setting a default printer in a host device which is connectable to an image forming apparatus, the method comprising:
   detecting information of a printer selected in an application program;
   transmitting a signal to set the selected printer as the default printer;
   transmitting a broadcast signal notifying other application programs of the set default printer after the selected printer is stored as the default printer by changing printer setup information of the selected printer to the printer setup information of a detected printer driver information, where the printer setup information of the detected printer driver information includes a default status setting; and
   maintaining the default setting of the printer driver information in the application program and another application program even after the application program is terminated.

16. The method of claim 15, wherein the information of the printer includes at least one of a number of sheets to be printed, a printing direction, a printing resolution and a printing layout.

* * * * *